United States Patent [19]

Muddiman

[11] Patent Number: 5,318,063

[45] Date of Patent: Jun. 7, 1994

[54] FLUID CHECK VALVE WITH REPLACEABLE VALVE SEAT AND FLAPPER ASSEMBLY

[76] Inventor: Robert W. Muddiman, c/o 487 Speers Road, Oakville, Ontario L6K 2G4, Canada

[21] Appl. No.: 19,832

[22] Filed: Feb. 19, 1993

[51] Int. Cl.⁵ ............................................. F16K 15/03
[52] U.S. Cl. ................................ 137/454.2; 137/512.1; 137/515; 137/527
[58] Field of Search ............... 137/454.2, 512.1, 515, 137/527

[56] References Cited

U.S. PATENT DOCUMENTS

| | | | |
|---|---|---|---|
| 3,374,804 | 3/1968 | Stegerud | 137/512.1 |
| 3,601,364 | 8/1971 | Scaramucci | 251/306 |
| 3,678,958 | 7/1972 | Satterwhite et al. | 137/512.1 |
| 3,771,764 | 11/1973 | Miyauchi | 251/306 |
| 3,815,869 | 6/1974 | Smith | 251/306 |
| 3,902,697 | 9/1975 | Robinson | 251/306 |
| 4,257,444 | 3/1981 | Ogle, Jr. et al. | 137/512.1 X |
| 4,457,333 | 7/1984 | Sharp | 137/512.1 X |
| 4,465,260 | 8/1984 | Conley et al. | 251/305 |
| 4,492,249 | 1/1985 | Arino et al. | 137/515 |
| 4,694,853 | 9/1987 | Goodwin | 137/512.1 |
| 4,774,981 | 10/1988 | Mizusawa | 137/512.1 |
| 4,896,695 | 1/1990 | Pysh | 137/512.1 |
| 4,977,926 | 12/1990 | Hocking | 137/512.1 |

Primary Examiner—John Rivell
Attorney, Agent, or Firm—McFadden, Fincham, Marcus & Anissimoff

[57] ABSTRACT

A fluid check valve of the two flapper variety which has replaceable seat flapper assembly. The assembly comprises a tubular ring having a seating area on the surface of one end and a reduced diameter portion on the other end. A pair of pin keepers are attached to opposite sides of the seat ring and the flappers are pivotably attached to a pin that passes through elongate holes in the keepers. The seat ring is a sliding fit in the bore of the valve body and abuts against an annular rib in the valve body bore. The reduced diameter portion of the seat ring extends through the annular rib. A retaining ring is attached to the reduced diameter portion by threaded engagement, bolts, or other means and tightened until it abuts against the other side of the annular rib thus holding the seat ring in tight assembly in the valve bore against the rib.

22 Claims, 3 Drawing Sheets

FLUID CHECK VALVE WITH REPLACEABLE VALVE SEAT AND FLAPPER ASSEMBLY invention relates to fluid check valves and is particularly concerned with providing a fluid check valve which has two valve flappers and a replaceable valve seat. Further, the replaceable valve seat is part of a seat member or ring which also carries two spaced opposed keepers for pivotally mounting the flappers.

The present invention provides for two advantages. In previous types of double-flapper check valves, hinge and stop pins are installed through holes which extend through the wall of the valve body. After installation of the pins, the holes are sealed by plugs or other means. While initially effective, there is a possibility of leakage from the inside to the outside past the seals.

Another disadvantage of the previous designs is that the flappers are free to move sideways in the bore. This sideways movement causes extra wear on the wall of the flapper hinge or bushing, depending upon actual design.

One modification made to avoid holes through the wall is to mount pins in inserts which fit into cavities machined into the inner surface of the body wall. These inserts are retained in place by various means. U.S. Pat. No. 4,694,853 describes and illustrates the various embodiments in which hinge pins and stop pins are mounted in insert position in recesses in the body wall.

Although holes through the body wall are eliminated, and thus also potential leak paths, the modifications using inserts are expensive to manufacture and the design can restrict the particular type of gasket that can be used. Thinning of the wall occurs, which is not desirable. Also, the holes through the inserts for the hinge pins are round and permit sideways movement of the hinge pins which causes wear and increased maintenance.

The present invention provides both for a replaceable seat for the flapper and also uses keepers for mounting the flappers, the keepers being mounted on a seat member or ring.

By the present invention, a replaceable seat is provided and also the avoidance of pins extending through the valve body, or inserts in machined cavities, is obtained. A separate retaining ring clamps the seat member or ring down against a ledge in the valve body.

The seat can readily be machined, prior to insertion, and also the seat can be removed and refinished if worn. Different metals can be used for the valve body and for the seat, providing the ability to use special materials for the valve seat.

Broadly, the invention provides a replaceable valve seat and flapper assembly for a fluid check valve, which has a tubular seat ring, having an annular seat surface at one end and a reduced diameter portion at the other end, a pair of diametrically opposed flat surfaces on an external surface of the seat ring adjacent the seat surface, a pair of keepers positioning the seat ring, a pair of substantially semi-circular flappers for positioning between the keepers and a pivot pin for pivotally mounting the flappers in the keepers, and a retaining ring for engaging with the reduced diameter portion, the seat ring, keepers and flappers, when assembled, being a sliding fit in the bore of a valve, the retaining ring acting to hold the seat ring against an abutment in the valve bore.

The invention will be readily understood by the following description of certain embodiments, by way of example, in conjunction with the accompanying drawings, in which.

Figure 1:
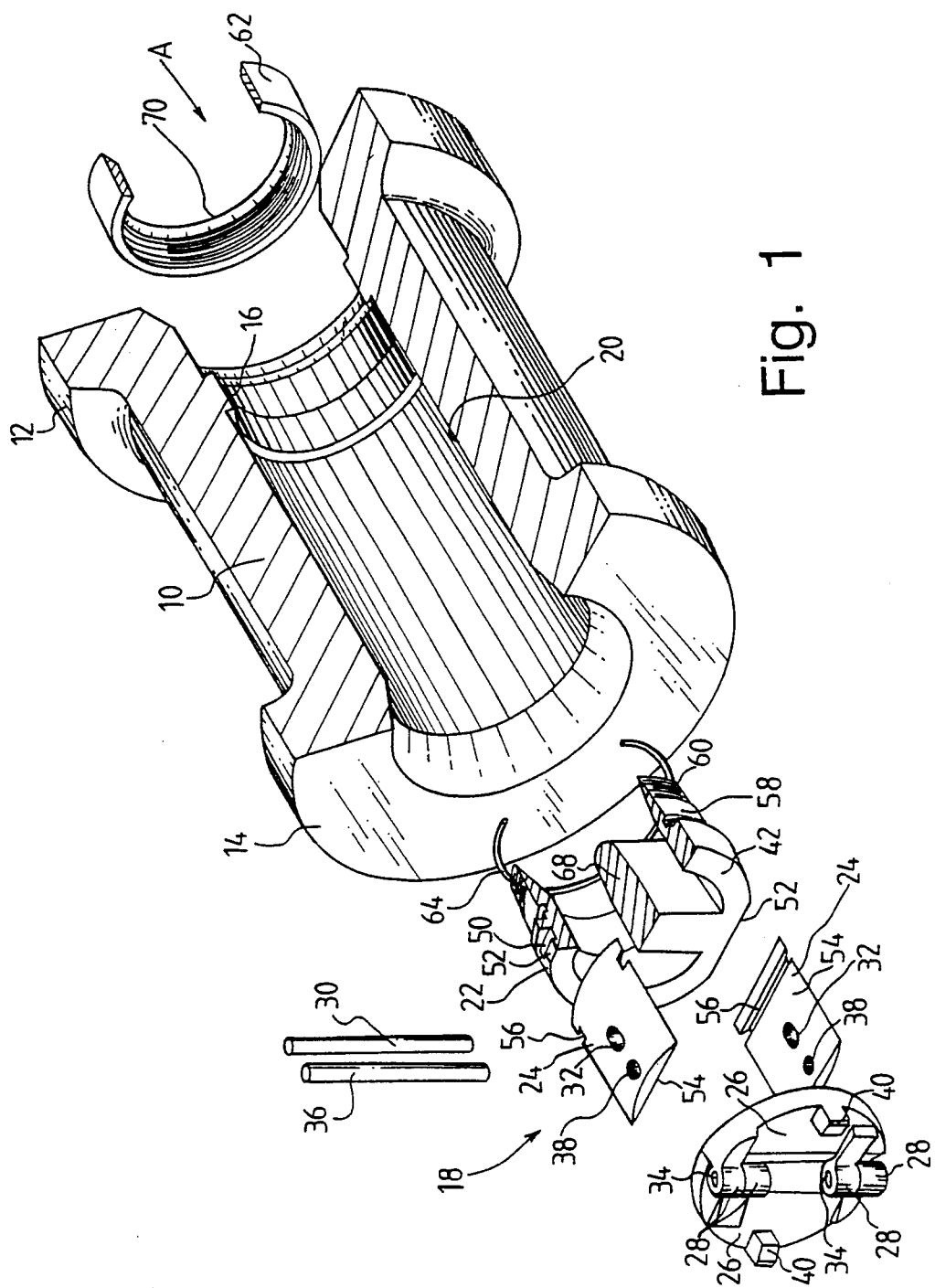
FIG. 1 is a sectioned, exploded perspective view of one form of valve in accordance with the invention.

As illustrated in the drawings, a check valve comprises a tubular body 10 with a forward end 12 and a rearward end 14. The flow is normally in the direction of the arrow A.

In the example as illustrated in FIGS. 1 to 4, adjacent the forward end 12 is an annular rib 16. A flapper and seat assembly, indicated generally at 18 in FIG. 1, is a sliding fit in the bore 20 of the body 10. The assembly 18 comprises a seat ring 22, two keepers 24, two flappers 26, having aligned hinged portions 28, and a hinge pin 30. The hinge pin passes through bores 32 in the keepers 24 and through bores 34 in the hinge portions 28. The bores 32 are elongate in the direction of the longitudinal axis of the valve, and have a transverse dimension such that the hinge pin can slide in the elongate slots, but not move sideways. This elongation has a length such that it enables the hingepin, and thus the flappers to move downstream, but the flappers are prevented from moving sideways.

A stop pin 36 can also be provided, extending through bores 38 in the keepers 24, to limit opening of each flapper. Alternatively, or in addition, stop members 40 can be provided on the flappers 26. The seat ring 22 has a valve seating 42.

Figure 2:
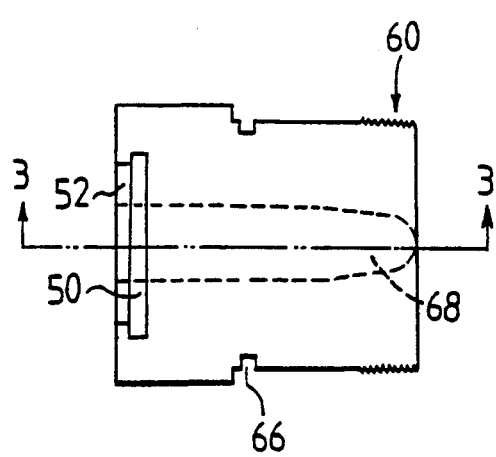
FIG. 2 is a side view of a seat ring, showing the keeper mounting formation.
Figure 3:
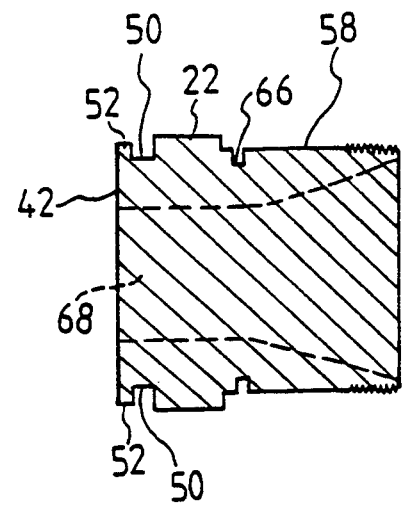
FIG. 3 is a cross-section on the line 3—3 of FIG. 2.
Figure 4:
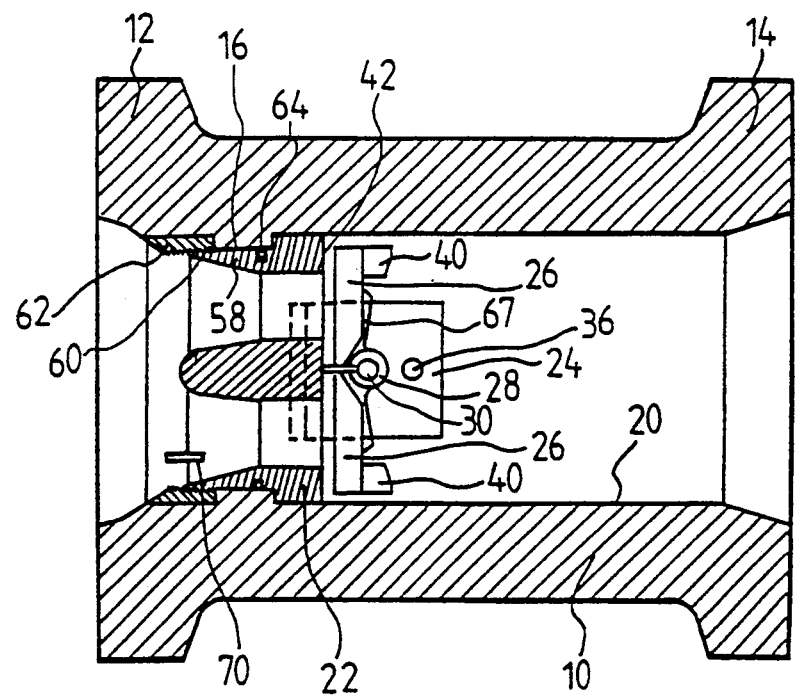
FIG. 4 is a longitudinal cross-section of an assembled valve, of the form of FIGS. 1 to 3.

As can be particularly seen in the embodiments illustrated in FIGS. 2 and 3, but is also shown in FIG. 1, the seat ring 22 has two flat surfaces 50 diametrically opposed on the main body of the seat ring. A rib 52 extends on each surface 50, the ribs extending transversely to the axis of the valve. Each keeper has a somewhat segmental form, the flat surface 54 of each keeper cooperating with a surface 50. A groove 56 on each surface 54 receives the rib 52.

Extending axially from the main body of the seat ring, is an annular skirt 58. The skirt 58 extends within the annular rib 16 in the bore on the body 10, and has an externally threaded end portion 60. An internally threaded retainer ring 62 screws onto the threaded portion 60. An O-ring 64 fits in a groove 66. A light spring 67 acts on the flappers, urging them to a closed position, the flappers urged to an open position by the normal flow through the valve. If a reverse flow occurs, the flappers shut against the seating 42.

A transverse member 68 is normally provided extending from the seat level and is aligned with the flat surface 50, and with the hinge pin 30. After the retaining ring has been tightened onto the skirt 58 of the seat ring, a hole can be drilled and a pin 70 inserted, in the interengaging threads to lock the retaining ring in position.

To assemble the valve, the O-ring 64 is positioned in the groove 66 and the keepers 24 are slid into position on the surfaces 50. The flappers are positioned on the seat ring between the keepers and the hinge pin inserted and also the stop pin if provided. The assembly is then slid into the bore 20 of the body until it rests on the rib 16. The retaining ring is screwed onto the seat ring, and the lock pin 70 then inserted. Holes can be formed in the outer end of the retaining ring for use by a tool for tightening the ring.

Figure 5:
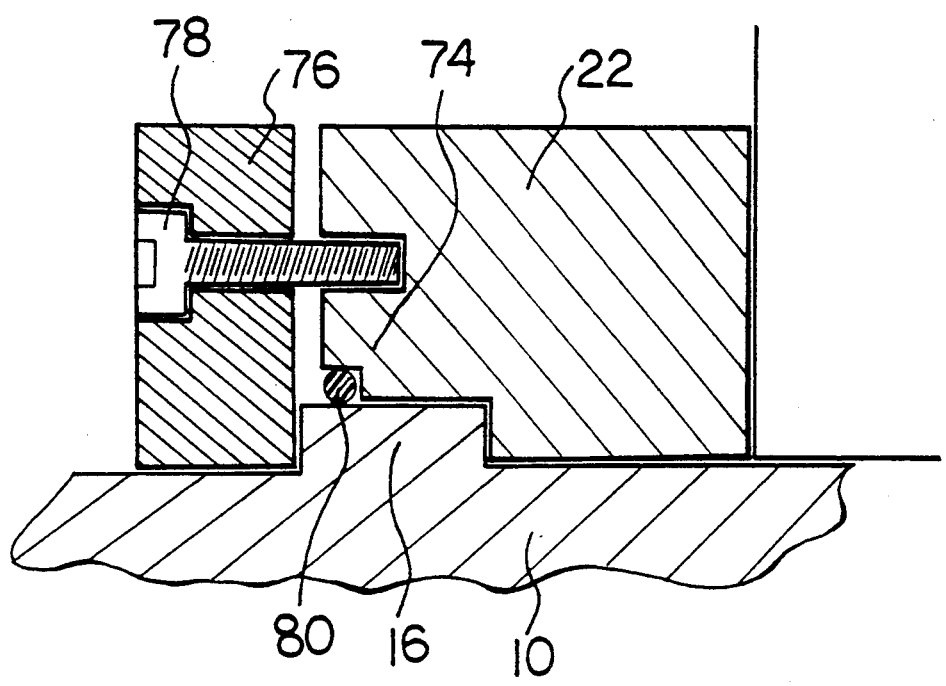
FIG. 5 is a cross-section of part of a seat ring and retaining ring, illustrating an alternative form of attachment of the retaining ring to the seat ring.

FIG. 5 illustrates an alternative arrangement of seating ring and retaining ring, common reference numerals applied where applicable. As in FIGS. 1 to 4, the valve body 10 has an annular rib 16. The valve seat has a reduced diameter portion 74. The portion 74 extends axially a distance slightly less than the axial width of the rib 16. A separate retainer ring 76, a sliding fit in the valve body, rests against the rib 16 on the side opposite to that of the seat ring 22. A series of screws 78, for example socket head cap screws, extend through bores in the retainer ring into threaded holes in the seat ring. Tightening the screws clamps the seat ring to the rib. A seal 80 can be provided.

As previously mentioned, the provision of a removable and replaceable seat ring has various advantages. For example, a special material which is more suitable for a valve seat can be used for this member while a more economic conventional material can be used for the main valve body. Also the valve seating surface can be very easily machined prior to insertion in the valve body, and if wear occurs on the valve seating then the member can be removed and the seating surface remachined. Also in event of other damage then the whole member can be removed and a new member inserted without the loss of the main valve body. Also there are no holes through the valve body for mounting the flappers nor are there are inserts machined into the valve body.

I claim:

1. A replaceable valve seat and flapper assembly for a fluid check valve, comprising:
   a tubular seat ring, having an annular seat surface at one end and a reduced diameter portion at the other end, said ring including a rib extending radially therefrom;
   a pair of keepers for positioning on said seat ring, said keepers extending axially from said seat ring;
   a pair of substantially semi-circular flappers for positioning between said keepers and a pivot pin for pivotally mounting said flappers in said keepers;
   a reduced diameter retaining ring for positioning on said reduced diameter portion, the seat ring, keepers and flappers, when assembled, being a sliding fit in a bore of a valve, said retaining ring acting to hold the seat ring against an abutment in the valve bore.

2. An assembly as claimed in claim 1, said reduced diameter portion being externally threaded and said retaining ring being internally threaded to screw onto said externally threaded reduced diameter portion.

3. An assembly as claimed in claim 1, said retaining ring attached to said seat ring by removable fastening means.

4. An assembly as claimed in claim 3, said removable fastening means comprising screws.

5. An assembly as claimed in claim 1, including a stop pin for mounting in said keepers and extending over said flappers to limit opening of each flapper to approximately 90°.

6. An assembly as claimed in claim 1, said pivot pin extending in an elongate bore in each of said keepers, said elongate bores extending in a direction parallel to the axis of the valve.

7. A replaceable valve seat and flapper assembly for positioning in a bore of a fluid check valve, said valve including an annular rib in said bore adjacent one end of said valve, comprising:
   a tubular seat ring having an annular seat surface at one end, an annular rib at said one end for positioning against one side of said annular rib in said bore of said valve and a reduce diameter portion at the other end, said ring having a sliding fit in said bore;
   a pair of diametrically opposed flat surfaces on an external surface of said seat ring, adjacent said seat surface;
   a pair of keepers for positioning on said flat surfaces;
   a pair of substantially semi-circular flappers positioned between said keepers, and a pivot pin pivotally mounting said flappers on said keepers, each flapper including a seat surface for engaging with said seat surface on said seat ring in a closed position, and a retaining ring positioned on said reduced diameter portion of said seat ring, said retaining ring abutting against the other side of said annular rib in said bore of said valve.

8. An assembly as claimed in claim 7, said reduced diameter portion being externally threaded and said retaining ring being internally threaded to screw onto said externally threaded reduced diameter portion.

9. An assembly as claimed in claim 7, said retaining ring attached to said seat ring by removable fastening means.

10. An assembly as claimed in claim 9, said removable fastening means comprising screws.

11. The assembly as claimed in claim 7, including a stop pin mounted in said keepers and extending over said flappers.

12. An assembly as claimed in claim 7, including locking means for locking said retaining ring to said seat ring in a tightened condition.

13. An assembly as claimed in claim 7, said seat ring including a transverse member, at said seat surface.

14. An assembly as claimed in claim 7, including means urging said flappers to a closed position.

15. An assembly as claimed in claim 7, said pivot pin extending in an elongate bore in each of said keepers, said elongate bores extending in a direction parallel to the axis of the valve.

16. A fluid check valve, with a replaceable valve seat and flapper assembly comprising:
   a check valve body having a bore, a forward end and a rear end, and an annular rib in said bore adjacent said forward end, said rib having opposed surfaces, and a valve seat and flapper assembly positioned in said bore, said valve seat and flapper assembly comprising:
   a tubular seat ring having an annular seat surface at one end;
   an annular rib at said one end positioned against one side of said annular rib at said forward end, and a reduced diameter portion at the other end, said ring having a sliding fit in said bore;
   a pair of diametrically opposed flat surfaces on an external surface of said seat ring adjacent said seat surface;
   a pair of keepers of segmental cross-section, each having a flat surface positioned on one of said flat surfaces of said seat ring, said keepers extending axially from said seat surface;

a pair of substantially semi-circular flappers positioned between said keepers, and a pivot pin pivotally mounting said flappers on said keepers, each flapper including a seat surface for engaging with said seat surface on said seat ring in a closed position; and a retaining ring positioned on said reduced diameter portion of said seat ring, said retaining ring abutting against the other side of said annular rib when tightened onto said seat ring.

17. An assembly as claimed in claim 16, said reduced diameter portion being externally threaded and said retaining ring being internally threaded to screw onto said externally threaded reduced diameter portion.

18. An assembly as claimed in claim 16, said retaining ring attached to said seat ring by removable fastening means.

19. An assembly as claimed in claim 18, said removable fastening means comprising screws.

20. A fluid check valve as claimed in claim 16, including a stop pin mounted in said keepers and extending over said flappers.

21. A fluid check valve as claimed in claim 16, said seat ring including a transverse member, at said seat surface.

22. A fluid check valve as claimed in claim 16, including means urging said flappers to a closed position.

* * * * *